US012705387B2

(12) United States Patent
Bhattacharya

(10) Patent No.: US 12,705,387 B2
(45) Date of Patent: Aug. 11, 2026

(54) SYSTEM AND METHOD FOR IDENTIFYING A DATA TYPE ASSOCIATED WITH AN APPLICATION SERVER

(71) Applicant: The Toronto-Dominion Bank, Toronto (CA)

(72) Inventor: Somak Bhattacharya, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 98 days.

(21) Appl. No.: 18/946,302

(22) Filed: Nov. 13, 2024

(65) Prior Publication Data

US 2026/0203438 A1 Jul. 16, 2026

(51) Int. Cl.
*G06F 21/62* (2013.01)
*H04L 9/32* (2006.01)

(52) U.S. Cl.
CPC ........ *G06F 21/6245* (2013.01); *H04L 9/3263* (2013.01)

(58) Field of Classification Search
CPC ........................... G06F 21/6245; H04L 9/3263
See application file for complete search history.

(56) References Cited

U.S. PATENT DOCUMENTS 6,182,142 B1 * 1/2001 Win .................... G06F 21/6218 709/227
10,671,750 B2 * 6/2020 Parthasarathy ....... G06F 21/602
11,388,186 B2 * 7/2022 Srivastava .............. H04L 63/20
2018/0123804 A1 * 5/2018 Smith ................... H04L 9/3263
2019/0095478 A1 * 3/2019 Tankersley .......... G06F 11/3419
2021/0344645 A1 * 11/2021 Vadayadiyil Raveendran ............ H04L 63/0281
2022/0335158 A1 * 10/2022 Xu ...................... G06F 21/6254
2023/0199489 A1 * 6/2023 Austin .................. H04L 9/3215 713/168
2023/0214522 A1 * 7/2023 Litvin ....................... G06F 7/02 707/692
2023/0418970 A1 * 12/2023 Dobrin ................ G06F 21/6245

FOREIGN PATENT DOCUMENTS

CN 108121637 B 1/2022

* cited by examiner

*Primary Examiner* — Harunur Rashid
(74) *Attorney, Agent, or Firm* — Borden Ladner Gervais LLP

(57) ABSTRACT

Computing platforms, methods, and storage media for identifying a data type associated with an application server are disclosed. Exemplary implementations may: determine, based on scanning real-time traffic associated with the application server, whether the application server is internet-facing; examine an application log associated with the application server with respect to presence of masking characters associated with masking personally identifiable information (PII); and in response to detecting masking characters in the application log: perform a real-time determination that the application server processes PII data; and generate a recommendation with respect to additional protection or encryption for the PII data. Exemplary implementations may automatically determine whether PII is being collected by a server based on access to an application log, and without having direct access to application data associated with the server.

20 Claims, 6 Drawing Sheets

| 512 | 510 | 508 | 506 | 504 | 502 |
|---|---|---|---|---|---|
| FullName | requestJSONPath / responseJSONPath → ..name[*].fullName | (. *)(? =\\w{4}.*).* | Mask everything but the last 4 characters | Han Solo | ****Solo |
| FirstName | requestJSONPath / responseJSONPath → ..name[*].firstName | [\\w]{1 }(.*) | Keep first letter then mask rest. | Theodore | T******* |
| MiddleName | requestJSONPath / responseJSONPath → ..name[*].middleName | (.*) | Mask everything | and Cheese | ********* |
| Last Name | requestJSONPath / responseJSONPath → ..name[*].lastName | [\\w]{1 }(.*) | Keep first letter then mask rest. | Broccoli | B****** |
| CompanyName | requestJSONPath / responseJSONPath → .../organizationName | (.*)(? =\\ d{4}.*).* | Mask everything but the last 4 characters | Broccoli | ****coli |
| TelephoneNum | requestJSONPath / responseJSONPath → ../telephoneNumber/telephoneNum | (.*)(? =\\w{4}.*).* | Mask everything but the last 4 characters | 5553450987 | ******0987 |
| ElectronicAddress | requestJSONPath / → | (.*)@.* | Mask | han@rebels.com | ***@rebels.com |

FIG.5

SYSTEM AND METHOD FOR IDENTIFYING A DATA TYPE ASSOCIATED WITH AN APPLICATION SERVER

FIELD

The present disclosure relates to data associated with a server, including but not limited to computing platforms, methods, and storage media for identifying a data type associated with an application server.

BACKGROUND

In data communications, servers and applications may send and receive different types of data. Depending on the data being transmitted, different security parameters and arrangements may be required, with increased protection in certain situations.

For example, additional protection may be desirable based on the sensitivity of the data being transmitted. However, current approaches are heavily human-centric and do not provide methods that can handle a variety of scenarios where it is desirable to identify the need for such additional protection.

Improvements in approaches for identifying a data type associated with an application server are desirable.

BRIEF DESCRIPTION OF THE DRAWINGS

Embodiments of the present disclosure will now be described, by way of example only, with reference to the attached Figures.

FIG. 5 illustrates an example of log pattern analysis in accordance with one or more embodiments.

DETAILED DESCRIPTION

Figure 1:
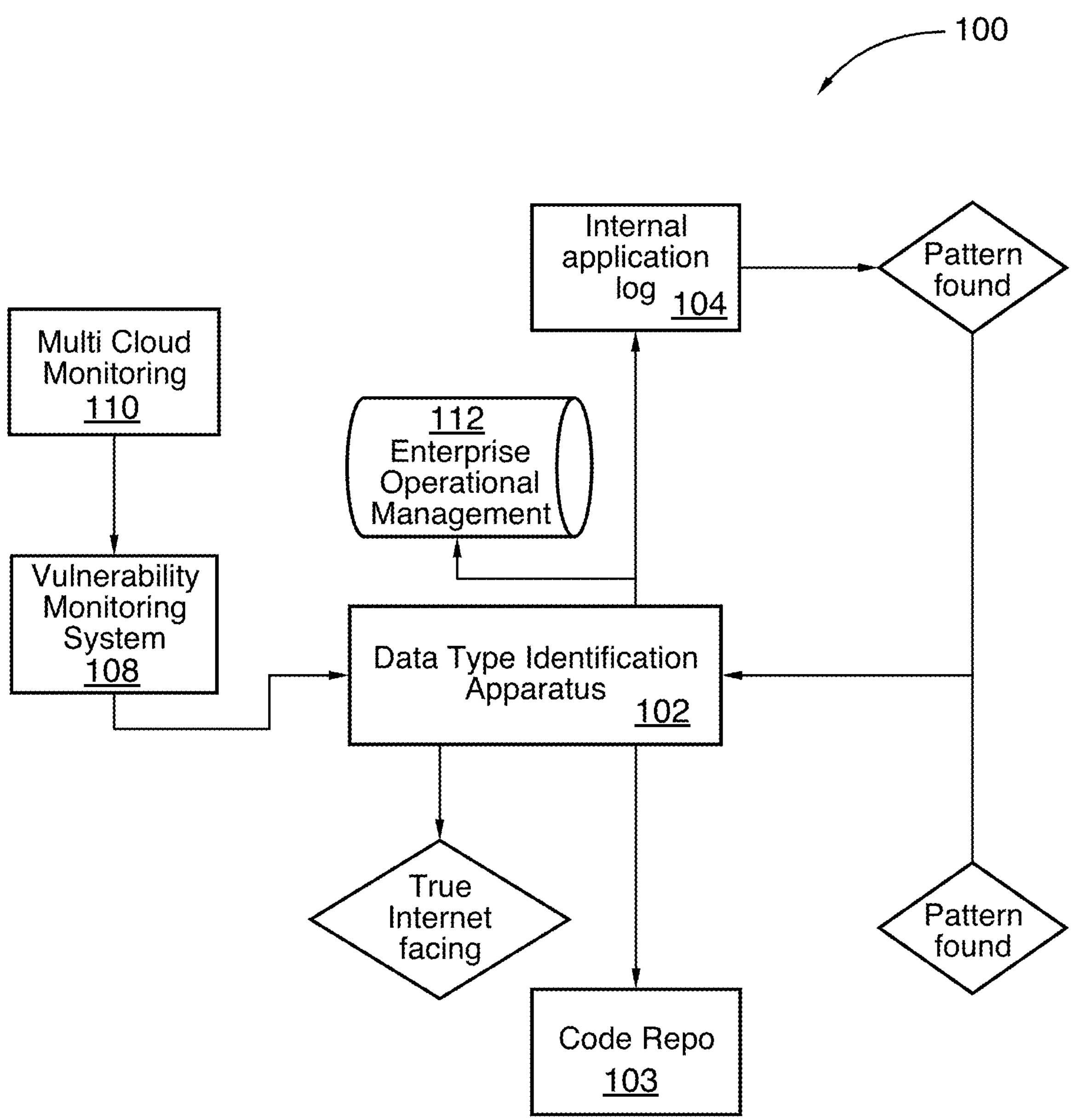
FIG. 1 illustrates a block and flow diagram showing a system configured for identifying a data type associated with an application server, in accordance with one or more embodiments.

Computing platforms, methods, and storage media for identifying a data type associated with an application server are disclosed. Exemplary implementations may: determine, based on scanning real-time traffic associated with the application server, whether the application server is internet-facing; examine an application log associated with the application server with respect to presence of masking characters associated with masking personally identifiable information; and in response to detecting masking characters in the application log: perform a real-time determination that the application server processes PII data; and generate a recommendation with respect to additional protection or encryption for the PII data.

Embodiments of the present disclosure provide a platform to determine, based on available backend data, whether a server is collecting personally identifiable information.

Personally identifiable information (PII) is defined in a National Institute of Standards and Technology (NIST) document, based on a United States Government Accountability Office report, as "any information about an individual maintained by an agency, including (1) any information that can be used to distinguish or trace an individual's identity, such as name, social security number, date and place of birth, mother's maiden name, or biometric records; and (2) any other information that is linked or linkable to an individual, such as medical, educational, financial, and employment information." PII comprises sensitive data subject to information governance. PII may include payment card information (PCI) or personal health information (PHI).

Embodiments of the present disclosure provide a system for determining whether PII is being collected by a server, or an application running on a server, without having direct access to application data. In contrast to front-end solutions, such as examining whether a Java script is collecting form data that includes PII, embodiments of the present disclosure are headless and do not have a front end. A system according to embodiments of the present disclosure may scan real-time traffic to determine whether a server is truly internet-facing and may then examine a developer-accessible application log. In response to detecting characters associated with masking PII data, the system makes a real-time determination that the application carries PII data and should have additional protection/encryption.

One aspect of the present disclosure relates to an apparatus or a computing platform configured for identifying a data type associated with an application server. The apparatus or computing platform may include a non-transient computer-readable storage medium having executable instructions embodied thereon. The apparatus or computing platform may include one or more hardware processors configured to execute the instructions. The processor(s) may execute the instructions to determine, based on scanning real-time traffic associated with the application server, whether the application server is internet-facing. The processor(s) may execute the instructions to examine an application log associated with the application server with respect to the presence of masking characters associated with masking personally identifiable information. The processor(s) may execute the instructions to, in response to detecting masking characters in the application log, perform a real-time determination that the application server processes PII data. The processor(s) may execute the instructions to generate a recommendation with respect to additional protection or encryption for the PII data.

Another aspect of the present disclosure relates to a method for identifying a data type associated with an application server. The method may include determining, based on scanning real-time traffic associated with the application server, whether the application server is internet-facing. The method may include examining an application log associated with the application server with respect to the presence of masking characters associated with masking personally identifiable information. The method may include, in response to detecting masking characters in the application log, performing a real-time determination that the application server processes PII data. The method may include generating a recommendation with respect to additional protection or encryption for the PII data.

Yet another aspect of the present disclosure relates to a non-transient computer-readable storage medium having instructions embodied thereon, the instructions being executable by one or more processors to perform a method of identifying a data type associated with an application server. The method may include determining, based on scanning real-time traffic associated with the application server, whether the application server is internet-facing. The method may include examining an application log associated with the application server with respect to the presence of masking characters associated with masking personally identifiable information. In response to detecting masking characters in the application log, the method may include performing a real-time determination that the application server processes PII data. The method may include generating a recommendation with respect to additional protection or encryption for the PII data.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

The term "masking character" refers to a constant symbol used to change characters of a data value. For example, a masking character of "*", "?" or "X" may be used to mask an underlying data value. Masking characters may be used when a user is entering a password into a form or field, to mask a character after it has been entered. Masking characters may also used to mask certain numbers or characters in a displayed credit card number, account number, account name or email address. Masking characters may be used for data anonymization and/or for protection. Masking characters are typically used to mask only a portion of a string of characters.

Protecting Internet-facing boundaries in data networking is a challenge that is more severe with the advent of artificial intelligence and quantum computing. A known scanning system may scan all DNS registries. Three layers of protection are generally provided for personally identifiable information data—WAF (Web Application Firewall), DDOS (Distributed Denial of Service) and F5 BOT.

A challenge is that some internet-facing apps may not be registered for BOT protection, as part of PII data protection. Alternatively, an app may not initially have been capturing PII, but a later business requirement may subsequently require the app to capture PII data. Additionally, there could be a headless implementation, or an application programming interface (API) exposed to the internet capturing PII data.

It is desirable to check automatically and in real-time whether an application is really capturing PII data. Despite some aspects of monitoring automation, known processes are heavily human-centric. Additionally, while bot protection is implemented for PII data entry, there is a cost associated with providing such bot protection. A site or app that does not collect PII data does not need this level of protection. Being able to remove bot protection when it is not needed results in resource, processor and/or cost improvements and savings.

A solution according to one or more embodiments of the present disclosure provides an automated PII data analyzer configured to receive a feed from a monitoring system and first filter out lower environment data by real-time checking internet exposure. The system may be configured to check a log pattern and code search to confirm PII data capture through an internet-facing UI or API.

In accordance with one or more embodiments, the present disclosure can enable one or more of the following: a network command-based analyzer can determine whether exposed to internet; a system may validate payload from an internal log as to whether the server is processing data that is carrying PII or PCI; the system can be enhanced to perform a search in code find out whether a server is processing PII.

In accordance with one or more embodiments, the present disclosure can help to define when an application is truly internet-facing and capturing PII data. This will automate additional defense mechanism such as BOT protection. This may also be leveraged to distinguish certificate protection mechanism (self-signed vs CA-signed) in the case of weak cipher related issues.

There is a technical problem associated with known approaches in that there is no automated or reliable way to determine, in real-time, whether a server, app or URL is truly internet-facing. A presumption of whether an entity is internet-facing is typically based on an initial determination or human-inspired indication, but there is a technical problem in that such determination or indication is not kept up-to-date and does not reflect current reality with respect to actual real-time traffic. In accordance with one or more embodiments, the present disclosure provides a technical solution including an automated method to determine whether a server, app or URL is truly internet-facing by scanning or monitoring real-time traffic, and making a determination based on the observed real-time traffic, since truly internet-facing traffic has different characteristics. There is another technical problem in that there is no automated way to determine whether an application server is processing sensitive data, such as personally identifiable information. Current approaches may provide an initial determination based on original intent, but this is not reflective of current reality with respect to actual real-time traffic. In accordance with one or more embodiments, the present disclosure provides a technical solution by providing an automated determination of whether PII is being processed, based on an analysis of real-time data.

FIG. 1 illustrates a block and flow diagram 100 showing a system configured for identifying a data type associated with an application server, in accordance with one or more embodiments. The system may be implemented as an automated real-time backend recognizer of personally identifiable information. The system may include an apparatus 102, such as a data type identification apparatus. The data type identification apparatus 102 may be configured to determine whether a system is truly internet-facing based on analysis of actual traffic data. As shown in FIG. 1, the data type identification apparatus 102 may be configured to generate and output a result of the determination of whether the system is truly internet-facing.

In an embodiment, the data type identification apparatus 102 may comprise an internet exposure determiner, and a PII auto validator in communication with the internet exposure determiner. The data type identification apparatus or internet-facing determiner may comprise a raw data or internet scanner for organizational sites and may comprise a lower environment or secured VPN tunnel-based URL. To filter out a non-internet-facing URL, the data type identification apparatus 102 may be configured to implement an algorithm with, for example, Python and Linux-based commands. For example, the command "Look for" may be used.

An example of a non-authoritative answer would be:

*** Can't find cl3api.pat.td.com: No answer

An example of an authoritative answer can be found from:

contains "td.com" or contains "td.com" OR "tdbank.ca"

Such commands may be implemented in relation to data such as the following:

patrickmeneley.com Domain pat-tdam.com Domain pat-td.com Domain pat-tdsecurities.com Domain pattilovettreid.com Domain The data type identification apparatus 102 may be in communication with an internal application log 104 and optionally with a code repository 106, or code repo, to determine whether an application or server is obtaining PII. The data type identification apparatus 102 may be configured to scan the internal application log 104 for masking characters associated with masking PII. The data type identification apparatus 102 may be configured to scan a code repository 106 for field names or other data typically associated with PII. As shown in FIG. 1, if a pattern is found in the application log 104, such as if masking characters are found, the result is returned to the data type identification apparatus 102. Similarly, if a pattern is found in the code repository 106, such as if field names or other data are found, the result is returned to the data type identification apparatus 102.

The data type identification apparatus 102 may be configured to obtain or receive data from a vulnerability monitoring system 108, which itself may be configured to obtain or receive data from a multi cloud monitoring system or apparatus 110. Such data may comprise data relating to the application server under analysis, and may comprise data relating to other application servers, apps or URLs. The data type identification apparatus 102 may be in communication with an operational management system 112, such as via an API, and may extract an application name from a DNS and/or confirm the application name with the operational management system 112.

In accordance with one or more embodiments, the apparatus 102 may be configured for identification of a data type associated with an application server. The apparatus 102 may comprise a non-transient computer-readable storage medium having executable instructions embodied thereon, and one or more hardware processors configured to execute the instructions to: determine, based on scanning real-time traffic associated with the application server, whether the application server is internet-facing; examine an application log associated with the application server with respect to presence of masking characters associated with masking personally identifiable information; and in response to detecting masking characters in the application log: perform a real-time determination that the application server processes PII data; and generate a recommendation with respect to additional protection or encryption for the PII data.

Figure 2A:
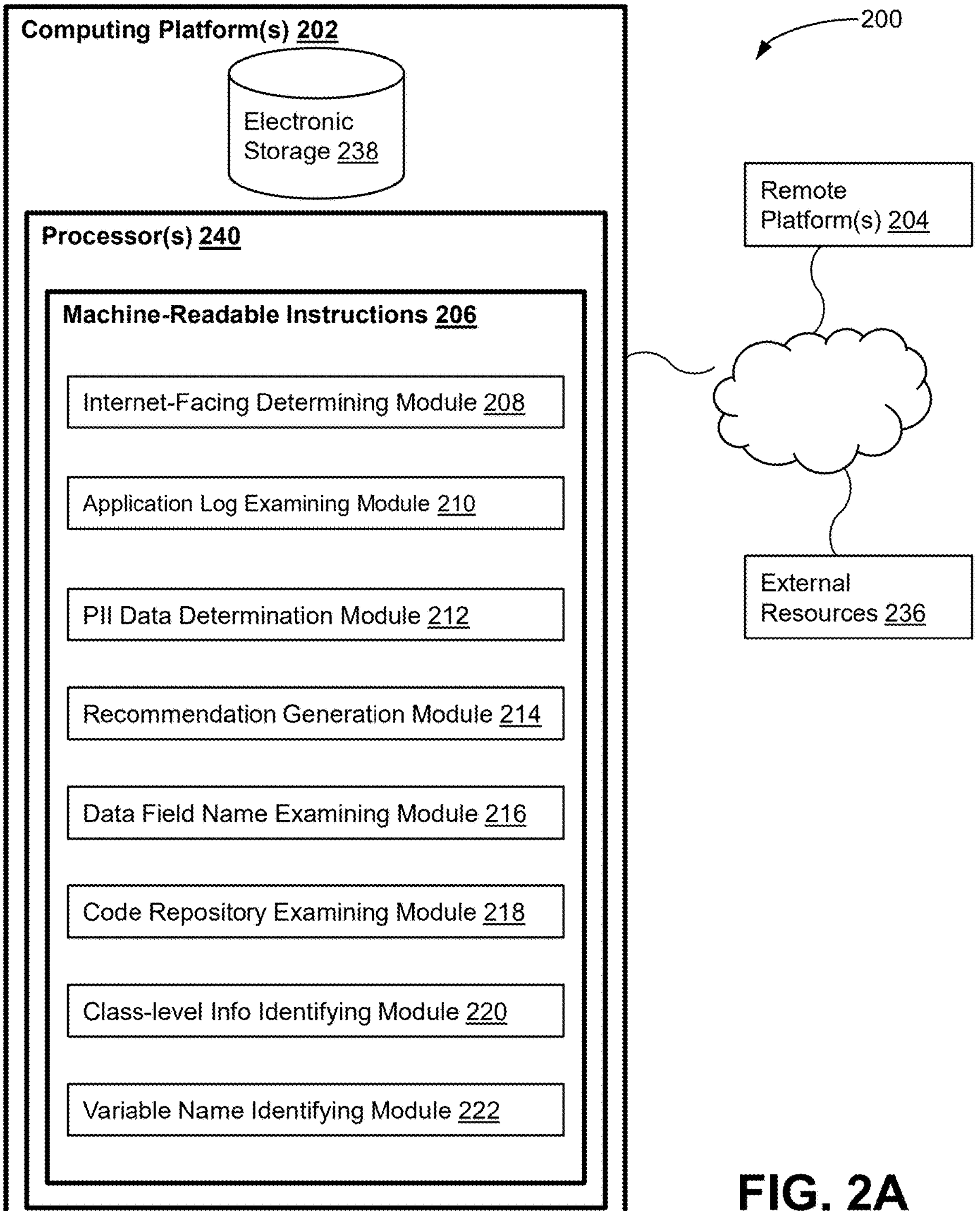
FIG. 2A illustrates a system configured for identifying a data type associated with an application server, in accordance with one or more embodiments.
Figure 2B:
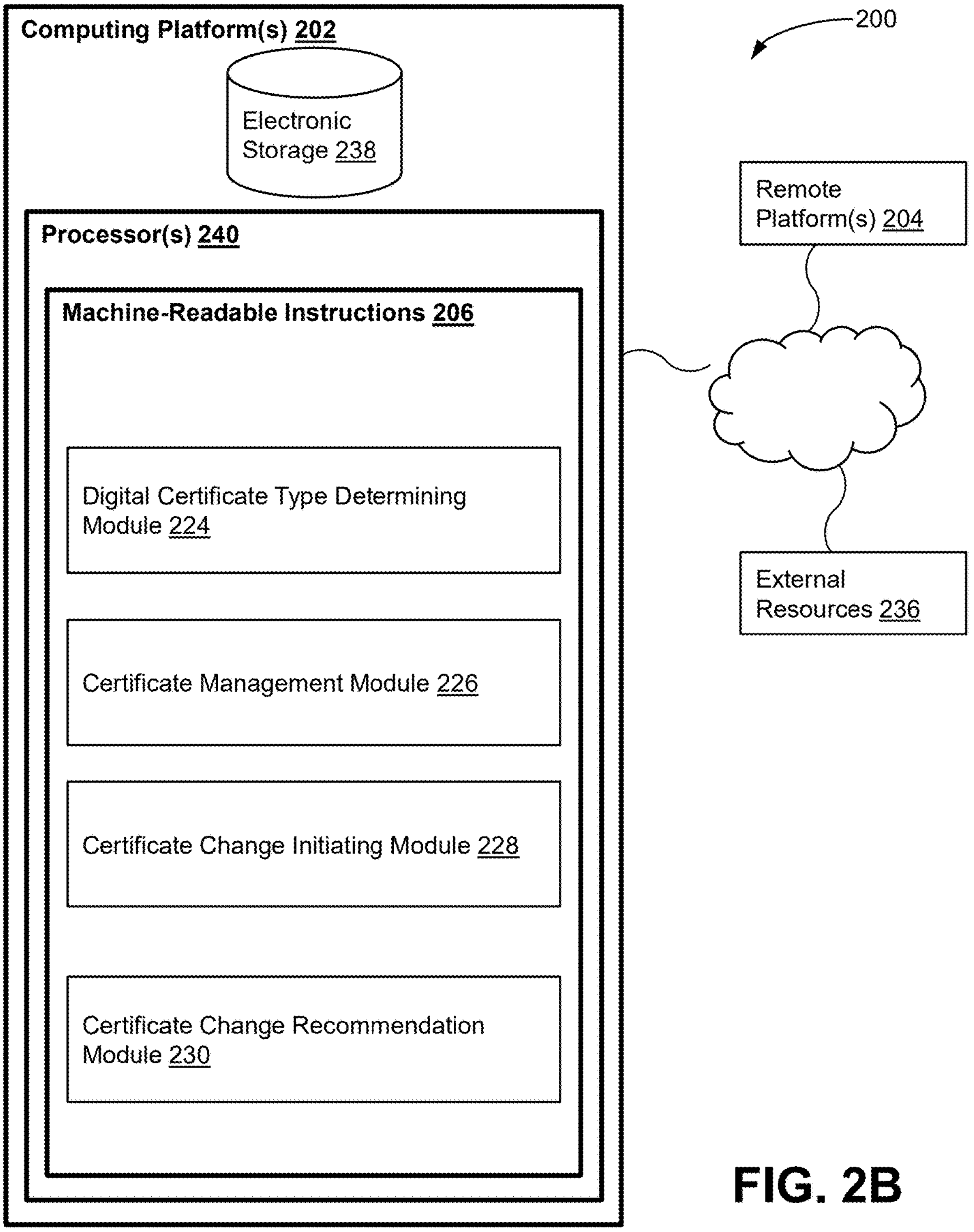
FIG. 2B illustrates a system configured for identifying a data type associated with an application server, in accordance with one or more embodiments.

FIG. 2A and FIG. 2B illustrate a system 200 configured for identifying a data type associated with an application server, in accordance with one or more embodiments. In some embodiments, system 200 may include one or more computing platforms 202. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by machine-readable instructions 206. Machine-readable instructions 206 may include one or more instruction modules. The instruction modules may include computer program modules. The instruction modules may include one or more of the following, as shown in FIG. 2A: internet-facing determining module 208, application log examining module 210, PII data determination module 212, recommendation generation module 214, data field name examining module 216, code repository examining module 218, class-level information identifying module 220, variable name identifying module 222, and/or other instruction modules. The instruction modules may include one or more of the following, as shown in FIG. 2B: digital certificate type determining module 224, certificate management module 226, certificate change initiating module 228, certificate change recommendation module 230, and/or other instruction modules.

Internet-facing determining module 208 may be configured to determine, based on scanning real-time traffic associated with the application server, whether the application server is internet-facing. Internet-facing determining module 208 may be configured to receive a feed from a monitoring system, the feed comprising the real-time traffic associated with the application server. Internet-facing determining module 208 may also, based on scanning the real-time traffic associated with the application server, determine a digital certificate type associated with the application server.

Application log examining module 210 may be configured to examine an application log associated with the application server with respect to presence of masking characters associated with masking personally identifiable information. Application log examining module 210 may be configured to examine the application log with respect to presence of masking characters independent of direct access to application data associated with the application server. Application log examining module 210 may be configured to examine the application log with respect to presence of a data field name associated with processing PII data.

PII data determination module 212 may be configured to perform a real-time determination that the application server processes PII data in response to detecting masking characters in the application log. PII data determination module 212 may be configured to perform the real-time determination that the application server processes PII data independent of direct access to application data associated with the application server. PII data determination module 212 may be configured to perform the real-time determination that the application server processes PII data in response to one or more of: detecting masking characters in the application log; and detecting presence of a data field name associated with processing PII data.

Recommendation generation module 214 may be configured to generate a recommendation with respect to additional protection or encryption for the PII data. Recommendation generation module 214 may be configured to generate a security recommendation based on determining that an API associated with the application server requires additional protection or encryption.

Data field name examining module 216 may be configured to examine the application log with respect to presence of a data field name associated with processing PII data.

Code repository examining module 218 may be configured to examine a code repository associated with the application server, for example with respect to code associated with processing PII data, like a query for login credentials for financial details relating to a transaction.

Class-level information identifying module 220 may be configured to identify class-level or application-level information associated with processing PII data. Alternatively, or additionally, code repository examining module 218 may be configured to identify class-level or application-level information associated with processing PII data.

Variable name identifying module 222 may be configured to identify presence or absence of a variable name associated with processing PII data, for example variable names such as "name", "password", "login credential", "account number", etc. Alternatively, or additionally, code repository examining module 218 may be configured to identify the presence or absence of a variable name associated with processing PII data.

Turning to FIG. 2B, digital certificate type determining module 224 may be configured to determine, based on scanning the real-time traffic associated with the application server, a digital certificate type associated with the application server. For example, the digital certificate type may be certificate authority signed or self-signed.

Certificate management module 226 may be configured to generate, based on the determination of whether the application server is internet-facing and based on the digital certificate type associated with the application server, a certificate management assessment result.

Certificate change initiating module 228 may be configured to initiate a certificate change if the digital certificate type is determined to be unsuitable with respect to security requirements associated with the application server. The determination of suitability or unsuitability of the digital certificate may be based on one or more factors such as those used by certificate change recommendation module 230 as described below.

Certificate change recommendation module 230 may be configured to provide an automated recommendation to change the digital certificate type to a self-signed certificate in response to determining that a certificate authority-signed digital certificate is associated with the URL and that the URL is not internet-facing.

Certificate change recommendation module 230 may be configured to provide an automated recommendation to change the digital certificate type to a certificate authority-signed certificate in response to determining that a self-signed digital certificate is associated with the URL and that the URL is internet-facing.

Certificate change recommendation module 230 may be configured to provide an automated recommendation to redeploy the CA-signed digital certificate to a different URL and to change the URL's digital certificate type to a self-signed certificate in response to determining that a CA-signed digital certificate is associated with the URL and that the URL is not internet-facing.

In some embodiments, computing platform(s) 202, remote platform(s) 204, and/or external resources 236 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 236 may be operatively linked via some other communication media.

A given remote platform 204 may include one or more processors configured to execute computer program modules. The computer program modules may be configured to enable an expert or user associated with the given remote platform 204 to interface with system 200 and/or external resources 236, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

External resources 236 may include sources of information outside of system 200, external entities participating with system 200, and/or other resources. In some embodiments, some or all of the functionality attributed herein to external resources 236 may be provided by resources included in system 200.

Computing platform(s) 202 may include electronic storage 238, one or more processors 240, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 238 may comprise non-transitory storage media that electronically stores information. The electronic storage media of electronic storage 238 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 248 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 238 may include one or more virtual storage resources (e.g., cloud storage, a virtual private network, and/or other virtual storage resources). Electronic storage 238 may store software algorithms, information determined by processor(s) 240, information received from computing platform(s) 202, information received from remote platform(s) 204, and/or other information that enables computing platform(s) 202 to function as described herein.

Processor(s) 240 may be configured to provide information processing capabilities in computing platform(s) 202.

As such, processor(s) 240 may include one or more of a digital processor, an analog processor, a digital circuit designed to process information, an analog circuit designed to process information, a state machine, and/or other mechanisms for electronically processing information. Although processor(s) 240 is shown in FIG. 2A and FIG. 2B as a single entity, this is for illustrative purposes only. In some embodiments, processor(s) 240 may include a plurality of processing units. These processing units may be physically located within the same device, or processor(s) 240 may represent processing functionality of a plurality of devices operating in coordination. Processor(s) 240 may be configured to execute modules 208, 210, 212, 214, 216, 218, 220, 222, 224, 226, 228, 230, and/or 232, and/or other modules. Processor(s) 250 may be configured to execute modules 208, 210, 212, 214, 216, 218, 220, 222, 224, 226, 228, 230, and/or 232, and/or other modules by software; hardware; firmware; some combination of software, hardware, and/or firmware; and/or other mechanisms for configuring processing capabilities on processor(s) 240. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, 214, 216, 218, 220, 222, 224, 226, 228, 230 and/or 232 are illustrated in FIG. 2A and FIG. 2B as being implemented within a single processing unit, in embodiments in which processor(s) 240 includes multiple processing units, one or more of modules 208, 210, 212, 214, 216, 218, 220, 222, 224, 226, 228, 230 and/or 232 may be implemented remotely from the other modules. The description of the functionality provided by the different modules 208, 210, 212, 214, 216, 218, 220, 222, 224, 226, 228, 230 and/or 232 described below is for illustrative purposes, and is not intended to be limiting, as any of modules 208, 210, 212, 214, 216, 218, 220, 222, 224, 226, 228, 230 and/or 232 may provide more or less functionality than is described. For example, one or more of modules 208, 210, 212, 214, 216, 218, 220, 222, 224, 226, 228, 230 and/or 232 may be eliminated, and some or all of its functionality may be provided by other ones of modules 208, 210, 212, 214, 216, 218, 220, 222, 224, 226, 228, 230 and/or 232. As another example, processor(s) 240 may be configured to execute one or more additional modules that may perform some or all of the functionality attributed below to one of modules 208, 210, 212, 214, 216, 218, 220, 222, 224, 226, 228, 230 and/or 232.

Figure 3:
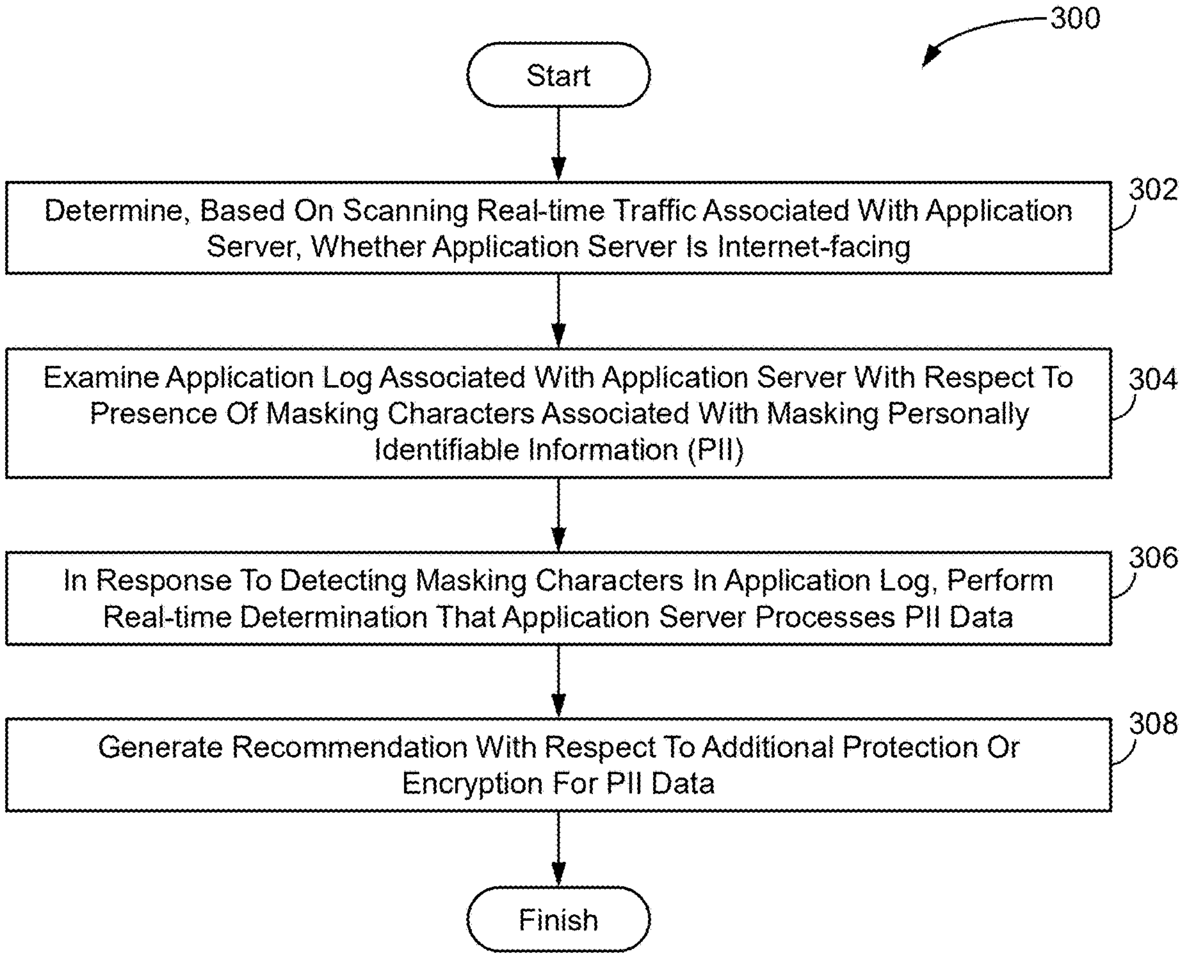
FIG. 3 illustrates a method for identifying a data type associated with an application server, in accordance with one or more embodiments.

FIG. 3 illustrates a method 300 for identifying a data type associated with an application server, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include determining, based on scanning real-time traffic associated with the application server, whether the application server is internet-facing. Operation 302 may be performed by one or more hardware processors configured by machine-readable instructions including a module that is the same as or similar to module 208, in accordance with one or more embodiments.

An operation 304 may include examining an application log associated with the application server with respect to presence of masking characters associated with masking personally identifiable information. Operation 304 may be performed by one or more hardware processors configured by machine-readable instructions including a module that is the same as or similar to module 210, in accordance with one or more embodiments.

An operation 306 may include, in response to detecting masking characters in the application log, performing a real-time determination that the application server processes PII data. Operation 306 may be performed by one or more hardware processors configured by machine-readable instructions including a module that is the same as or similar to module 212, in accordance with one or more embodiments.

An operation 308 may include generating a recommendation with respect to additional protection or encryption for the PII data. Operation 308 may be performed by one or more hardware processors configured by machine-readable instructions including a module that is the same as or similar to module 214, in accordance with one or more embodiments.

Figure 4:
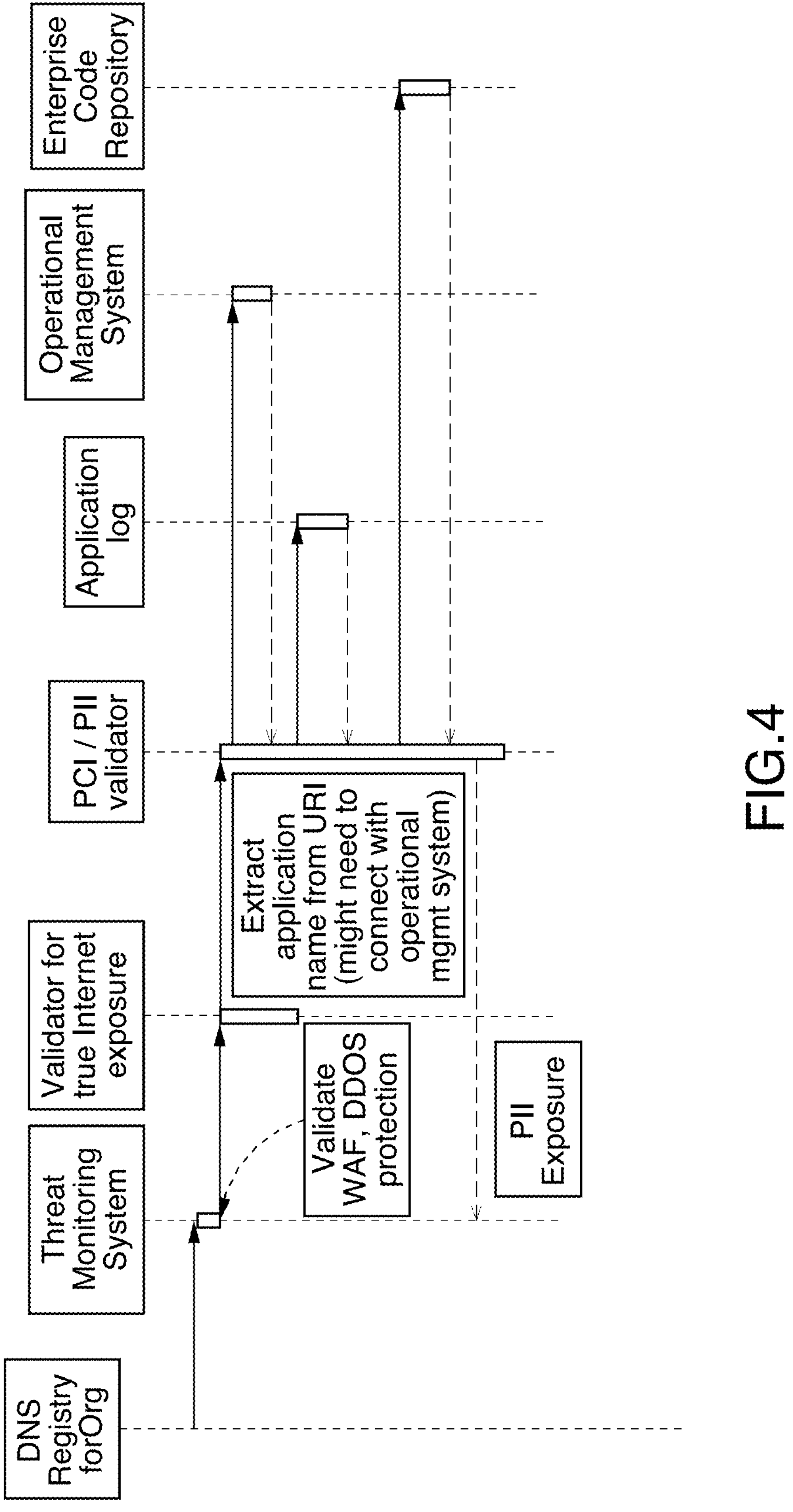
FIG. 4 illustrates a sequence diagram associated with a system in accordance with one or more embodiments.

FIG. 4 illustrates a sequence diagram 400 associated with a system in accordance with one or more embodiments. The sequence diagram 400 illustrates steps in a method according to an embodiment of the present disclosure, including an internet exposure validator and a PCI/PII validator. In an example embodiment, a PCI/PII validator is configured to receive an output from a validator for true internet exposure. The PCI/PII validator may be configured to extract an application name from a uniform resource identifier (URI), and may be configured to connect with an operational management system. The PCI/PII validator may be configured to examine a developer-accessible application log associated with the URI with respect to presence of masking characters associated with masking PII. In response to detecting masking characters in the application log, the PCI/PII validator may be configured to make a real-time determination that an application server associated with the URI processes PII data and may be configured to generate a recommendation with respect to additional protection or encryption. The PCI/PII validator may be configured to provide a PII exposure indication to a threat monitoring system.

FIG. 5 illustrates an example 500 of log pattern analysis in accordance with one or more embodiments. The characters in the right-most column 502 comprise text that may be stored in an application log, and include one or more masking characters shown as an asterisk (*). The column 504 to its left shows the corresponding full text of PII that may be stored in an application itself, without the masking characters. Also shown in FIG. 5 are the associated field names 512 which may provide a confirmation or further indication of collection of PII, as well as commands 506, 508 and 510 to request certain PII data or mask such data.

In an implementation associated with FIG. 5, a system may extract an application name from a DNS and/or confirm the application name with an operational management system via API and find a log pattern to confirm the presence of PII. An organization repository search for that application code may comprise, for example: Git grep "name"—'*.*'

In accordance with one or more embodiments, the present disclosure provides a system for determining whether PII is being collected by a server, app or URL without having direct access to application data. In contrast to front-end solutions, embodiments of the present disclosure may be headless and not have a front end. The system may scan to determine whether a server, app or URL is truly internet-facing, and may then examine a developer-accessible log. In response to detecting characters associated with masking PII data, the system makes a real-time determination that an application, server or URL carries PII data and should have additional protection/encryption.

In accordance with one or more embodiments, the present disclosure may determine whether a server or application is truly internet-facing, and may check an application log to identify a PII pattern. In known implementations where a Java script is collecting form data, a solution may be used to determine whether the Java script is taking PII data by monitoring and examining the form data. However, this is a front-end solution and is not applicable in many implementations. A solution according to one or more embodiments is headless and does not have a front end. A solution according to one or more embodiments determines whether PII data is being obtained by going to an application log and finding a log pattern, and based on that determine which system is collecting data. For example, the system or method may go in to a code repository in GIT and trace back to code class and find out that it is an API or backend system and determine whether or not it is really taking PII data.

In an implementation, a backend-based system may be configured to scan an application log, and find some masking characters (e.g. stars and letters in it). The system may be configured to find in a log that this is the pattern. An application itself may be storing all of the unmasked data somewhere, including the actual PII data; however, in the log for the application, there may be restrictions on storage or display of PII-like data.

In an implementation, a system may, using a determination system: look at the application or server log that is accessible to developers; scan to see characters that are typically associated with masking PII data, such as search for masking characters; if masking characters are found, then make an initial determination that it is a PII; then as an additional measure, to make sure, check the class level and application level information.

In an example implementation, the system may check the application and do a GIT grab and search whether having this kind of variable name in the request/response section of the response. Even though an application may be internet-facing, it may only be headless, and not have a UI; in such cases it is not possible to run a Java-based capture according to known approaches, but it is possible to identify where it carries PII data in accordance with one or more embodiments of the present disclosure.

In response to identifying masking characters, and optionally confirming presence of PII data by other means, one or more embodiments of the present disclosure are configured to mark that the API needs additional protection/encryption. This may be a real-time determination from a backend log that it carries PII data.

Components of embodiments of the present disclosure may comprise: an internet exposure determiner; and a PII auto validator, which accesses internal application log and code repo. The True Internet Exposure Determiner may be implemented as a Linux command based light weight python code The PII Validator, which may be implemented as a configurable light weight python-based module, may connect with multiple systems such as an operational management system and a logging monitoring system. The system may be enhanced with future business processes and auto learning. The Internet Exposure Determiner may be used to determine a case for self-signed vs CA-signed certificate is required in case of certificate related threat.

Implementing a solution in accordance with one or more embodiments of the present disclosure may provide one or more of the following advantages: save time and money by automating an organization's true PII data capture map in real-time and producing a front-end to back-end map for it; organization would be future ready for AI-Quantum era threat model.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the CLAIMS appended hereto.

Embodiments of the disclosure can be described with reference to the following clauses, with specific features laid out in the dependent clauses:

One aspect of the present disclosure relates to a system configured for identifying a data type associated with an application server. The system may include one or more hardware processors configured by machine-readable instructions. The processor(s) may be configured to determine, based on scanning real-time traffic associated with the application server, whether the application server is internet-facing. The processor(s) may be configured to examine an application log associated with the application server with respect to presence of masking characters associated with masking personally identifiable information (PII). The processor(s) may be configured, in response to detecting masking characters in the application log, to perform a real-time determination that the application server processes PII data. The processor(s) may be configured to generate a recommendation with respect to additional protection or encryption for the PII data.

In some implementations of the system, the processor(s) may be configured to perform the real-time determination that the application server processes PII data independent of direct access to application data associated with the application server.

In some implementations of the system, the processor(s) may be configured to examine the application log with respect to presence of the masking characters independent of direct access to application data associated with the application server.

In some implementations of the system, the processor(s) may be configured to examine the application log with respect to presence of a data field name associated with processing PII data. In some implementations of the system, the processor(s) may be configured to perform the real-time determination that the application server processes PII data in response to one or more of detecting marking characters in the application log and detecting presence of a data field name associated with processing PII data.

In some implementations of the system, the processor(s) may be configured to examine a code repository associated with the application server. In some implementations of the system, the processor(s) may be configured to identify class-level or application-level information associated with processing PII data.

In some implementations of the system, the processor(s) may be configured to examine a code repository associated with the application server. In some implementations of the system, the processor(s) may be configured to identify presence or absence of a variable name associated with processing PII data.

In some implementations of the system, the processor(s) may be configured to generate a security recommendation based on determining that an application programming interface (API) associated with the application server requires additional protection or encryption.

In some implementations of the system, the processor(s) may be configured to receive a feed from a monitoring system, the feed comprising the real-time traffic associated with the application server.

In some implementations of the system, the PII may comprise payment card information (PCI) or personal health information (PHI).

In some implementations of the system, the PII may comprise sensitive data subject to information governance.

In some implementations of the system, the processor(s) may be configured to determine, based on scanning the real-time traffic associated with the application server, a digital certificate type associated with the application server. In some implementations of the system, the processor(s) may be configured to generate, based on the determination of whether the application server is internet-facing and based on the digital certificate type associated with the application server, a certificate management assessment result.

In some implementations of the system, the processor(s) may be configured to initiate a certificate change if the digital certificate type is determined to be unsuitable with respect to security requirements associated with the application server.

In some implementations of the system, the processor(s) may be configured to provide an automated recommendation to change the digital certificate type to a self-signed certificate in response to determining that a certificate authority (CA) signed digital certificate is associated with the URL and that the URL is not internet-facing.

In some implementations of the system, the processor(s) may be configured to provide an automated recommendation to change the digital certificate type to a certificate authority (CA)-signed certificate in response to determining that a self-signed digital certificate is associated with the URL and that the URL is internet-facing.

In some implementations of the system, the processor(s) may be configured to provide an automated recommendation to redeploy the CA-signed digital certificate to a different URL and to change the URL's digital certificate type to a self-signed certificate in response to determining that a CA-signed digital certificate is associated with the URL and that the URL is not internet-facing.

Another aspect of the present disclosure relates to a processor-implemented method of identifying a data type associated with an application server. The method may include determining, based on scanning real-time traffic associated with the application server, whether the application server is internet-facing. The method may include examining an application log associated with the application server with respect to presence of masking characters associated with masking personally identifiable information (PII). The method may include, in response to detecting masking characters in the application log, performing a real-time determination that the application server processes PII data. The method may include generating a recommendation with respect to additional protection or encryption for the PII data.

In some implementations of the method, it may include performing the real-time determination that the application server processes PII data independent of direct access to application data associated with the application server.

In some implementations of the method, it may include examining the application log with respect to presence of the masking characters independent of direct access to application data associated with the application server.

In some implementations of the method, it may include examining the application log with respect to presence of a data field name associated with processing PII data. In some implementations of the method, it may include performing the real-time determination that the application server processes PII data in response to one or more of detecting marking characters in the application log and detecting presence of a data field name associated with processing PII data.

In some implementations of the method, it may include examining a code repository associated with the application server. In some implementations of the method, it may include identifying class-level or application-level information associated with processing PII data.

In some implementations of the method, it may include examining a code repository associated with the application server. In some implementations of the method, it may include identifying presence or absence of a variable name associated with processing PII data.

In some implementations of the method, it may include generating a security recommendation based on determining that an application programming interface (API) associated with the application server requires additional protection or encryption.

In some implementations of the method, it may include receiving a feed from a monitoring system, the feed comprising the real-time traffic associated with the application server.

In some implementations of the method, the PII may include payment card information (PCI) or personal health information (PHI).

In some implementations of the method, the PII may include sensitive data subject to information governance.

In some implementations of the method, it may include determining, based on scanning the real-time traffic associated with the application server, a digital certificate type associated with the application server. In some implementations of the method, it may include generating, based on the determination of whether the application server is internet-facing and based on the digital certificate type associated with the application server, a certificate management assessment result.

In some implementations of the method, it may include initiating a certificate change if the digital certificate type is determined to be unsuitable with respect to security requirements associated with the application server.

In some implementations of the method, it may include in response to determining that a certificate authority (CA) signed digital certificate is associated with the URL and that the URL is not internet-facing, providing an automated recommendation to change the digital certificate type to a self-signed certificate.

In some implementations of the method, it may include in response to determining that a self-signed digital certificate is associated with the URL and that the URL is internet-facing, providing an automated recommendation to change the digital certificate type to a certificate authority (CA)-signed certificate.

In some implementations of the method, it may include in response to determining that a CA-signed digital certificate is associated with the URL and that the URL is not internet-facing, providing an automated recommendation to redeploy the CA-signed digital certificate to a different URL and to change the URL's digital certificate type to a self-signed certificate.

Yet another aspect of the present disclosure relates to a non-transient computer-readable storage medium having instructions embodied thereon, the instructions being executable by one or more processors to perform a method for identifying a data type associated with an application server. The method may include determining, based on scanning real-time traffic associated with the application server, whether the application server is internet-facing. The method may include examining an application log associated with the application server with respect to presence of masking characters associated with masking personally identifiable information (PII). The method may include, in response to detecting masking characters in the application log, performing a real-time determination that the application server processes PII data. The method may include generating a recommendation with respect to additional protection or encryption for the PII data.

In some implementations of the computer-readable storage medium, the method may include performing the real-time determination that the application server processes PII data independent of direct access to application data associated with the application server.

In some implementations of the computer-readable storage medium, the method may include examining the application log with respect to presence of the masking characters independent of direct access to application data associated with the application server.

In some implementations of the computer-readable storage medium, the method may include examining the application log with respect to presence of a data field name associated with processing PII data. In some implementations of the computer-readable storage medium, the method may include performing the real-time determination that the application server processes PII data in response to one or more of detecting marking characters in the application log and detecting presence of a data field name associated with processing PII data.

In some implementations of the computer-readable storage medium, the method may include examining a code repository associated with the application server. In some implementations of the computer-readable storage medium, the method may include identifying class-level or application-level information associated with processing PII data.

In some implementations of the computer-readable storage medium, the method may include examining a code repository associated with the application server. In some implementations of the computer-readable storage medium, the method may include identifying presence or absence of a variable name associated with processing PII data.

In some implementations of the computer-readable storage medium, the method may include generating a security recommendation based on determining that an application programming interface (API) associated with the application server requires additional protection or encryption.

In some implementations of the computer-readable storage medium, the method may include receiving a feed from a monitoring system, the feed comprising the real-time traffic associated with the application server.

In some implementations of the computer-readable storage medium, the PII may comprise payment card information (PCI) or personal health information (PHI).

In some implementations of the computer-readable storage medium, the PII may comprise sensitive data subject to information governance.

In some implementations of the computer-readable storage medium, the method may include determining, based on scanning the real-time traffic associated with the application server, a digital certificate type associated with the application server. In some implementations of the computer-readable storage medium, the method may include generating, based on the determination of whether the application server is internet-facing and based on the digital certificate type associated with the application server, a certificate management assessment result.

In some implementations of the computer-readable storage medium, the method may include initiating a certificate change if the digital certificate type is determined to be unsuitable with respect to security requirements associated with the application server.

In some implementations of the computer-readable storage medium, the method may include in response to determining that a certificate authority (CA) signed digital certificate is associated with the URL and that the URL is not internet-facing, providing an automated recommendation to change the digital certificate type to a self-signed certificate.

In some implementations of the computer-readable storage medium, the method may include in response to determining that a self-signed digital certificate is associated with the URL and that the URL is internet-facing, providing an automated recommendation to change the digital certificate type to a certificate authority (CA)-signed certificate.

In some implementations of the computer-readable storage medium, the method may include in response to determining that a CA-signed digital certificate is associated with the URL and that the URL is not internet-facing, providing an automated recommendation to redeploy the CA-signed digital certificate to a different URL and to change the URL's digital certificate type to a self-signed certificate.

Still another aspect of the present disclosure relates to a system configured for identifying a data type associated with an application server. The system may include means for determining, based on scanning real-time traffic associated with the application server, whether the application server is internet-facing. The system may include means for examining an application log associated with the application server with respect to presence of masking characters associated with masking personally identifiable information (PII). The system may include means for, in response to detecting masking characters in the application log, performing a real-time determination that the application server processes PII data. The system may include means for generating a recommendation with respect to additional protection or encryption for the PII data.

In some implementations of the system, the system may include means for performing the real-time determination that the application server processes PII data independent of direct access to application data associated with the application server.

In some implementations of the system, the system may include means for examining the application log with respect to presence of the masking characters independent of direct access to application data associated with the application server.

In some implementations of the system, the system may include means for examining the application log with respect to presence of a data field name associated with processing PII data. In some implementations of the system, the system may include means for performing the real-time determination that the application server processes PII data in response to one or more of detecting marking characters in the application log and detecting presence of a data field name associated with processing PII data.

In some implementations of the system, the system may include means for examining a code repository associated with the application server. In some implementations of the system, the system may include means for identifying class-level or application-level information associated with processing PII data.

In some implementations of the system, the system may include means for examining a code repository associated with the application server. In some implementations of the system, the system may include means for identifying presence or absence of a variable name associated with processing PII data.

In some implementations of the system, the system may include means for generating a security recommendation based on determining that an application programming interface (API) associated with the application server requires additional protection or encryption.

In some implementations of the system, the system may include means for receiving a feed from a monitoring system, the feed comprising the real-time traffic associated with the application server.

In some implementations of the system, the PII may include payment card information (PCI) or personal health information (PHI).

In some implementations of the system, the PII may include sensitive data subject to information governance.

In some implementations of the system, the system may include means for determining, based on scanning the real-time traffic associated with the application server, a digital certificate type associated with the application server. In some implementations of the system, the system may include means for generating, based on the determination of whether the application server is internet-facing and based on the digital certificate type associated with the application server, a certificate management assessment result.

In some implementations of the system, the system may include means for initiating a certificate change if the digital certificate type is determined to be unsuitable with respect to security requirements associated with the application server.

In some implementations of the system, the system may include means for providing an automated recommendation to change the digital certificate type to a self-signed certificate in response to determining that a certificate authority (CA) signed digital certificate is associated with the URL and that the URL is not internet-facing.

In some implementations of the system, the system may include means for providing an automated recommendation to change the digital certificate type to a certificate authority (CA)-signed certificate in response to determining that a self-signed digital certificate is associated with the URL and that the URL is internet-facing.

In some implementations of the system, the system may include means for providing an automated recommendation to redeploy the CA-signed digital certificate to a different URL and to change the URL's digital certificate type to a self-signed certificate in response to determining that a CA-signed digital certificate is associated with the URL and that the URL is not internet-facing.

Even another aspect of the present disclosure relates to a computing platform configured for identifying a data type associated with an application server. The computing platform may include a non-transient computer-readable storage medium having executable instructions embodied thereon. The computing platform may include one or more hardware processors configured to execute the instructions. The processor(s) may execute the instructions to determine, based on scanning real-time traffic associated with the application server, whether the application server is internet-facing. The processor(s) may execute the instructions to examine an application log associated with the application server with respect to presence of masking characters associated with masking personally identifiable information (PII). The processor(s) may execute the instructions to, in response to detecting masking characters in the application log, perform a real-time determination that the application server processes PII data. The processor(s) may execute the instructions to generate a recommendation with respect to additional protection or encryption for the PII data.

In some implementations of the computing platform, the processor(s) may execute the instructions to perform the real-time determination that the application server processes PII data independent of direct access to application data associated with the application server.

In some implementations of the computing platform, the processor(s) may execute the instructions to examine the application log with respect to presence of the masking characters independent of direct access to application data associated with the application server.

In some implementations of the computing platform, the processor(s) may execute the instructions to examine the application log with respect to presence of a data field name associated with processing PII data. In some implementations of the computing platform, the processor(s) may execute the instructions to perform the real-time determination that the application server processes PII data in response to one or more of detecting marking characters in the application log and detecting presence of a data field name associated with processing PII data.

In some implementations of the computing platform, the processor(s) may execute the instructions to examine a code repository associated with the application server. In some implementations of the computing platform, the processor(s) may execute the instructions to identify class-level or application-level information associated with processing PII data.

In some implementations of the computing platform, the processor(s) may execute the instructions to examine a code repository associated with the application server. In some implementations of the computing platform, the processor(s) may execute the instructions to identify presence or absence of a variable name associated with processing PII data.

In some implementations of the computing platform, the processor(s) may execute the instructions to generate a security recommendation based on determining that an application programming interface (API) associated with the application server requires additional protection or encryption.

In some implementations of the computing platform, the processor(s) may execute the instructions to receive a feed from a monitoring system, the feed comprising the real-time traffic associated with the application server.

In some implementations of the computing platform, the PII may comprise payment card information (PCI) or personal health information (PHI).

In some implementations of the computing platform, the PII may comprise sensitive data subject to information governance.

In some implementations of the computing platform, the processor(s) may execute the instructions to determine, based on scanning the real-time traffic associated with the application server, a digital certificate type associated with the application server. In some implementations of the computing platform, the processor(s) may execute the instructions to generate, based on the determination of whether the application server is internet-facing and based on the digital certificate type associated with the application server, a certificate management assessment result.

In some implementations of the computing platform, the processor(s) may execute the instructions to initiate a certificate change if the digital certificate type is determined to be unsuitable with respect to security requirements associated with the application server.

In some implementations of the computing platform, the processor(s) may execute the instructions to, in response to determining that a certificate authority (CA) signed digital certificate is associated with the URL and that the URL is not internet-facing, provide an automated recommendation to change the digital certificate type to a self-signed certificate.

In some implementations of the computing platform, the processor(s) may execute the instructions to, in response to determining that a self-signed digital certificate is associated with the URL and that the URL is internet-facing, provide an automated recommendation to change the digital certificate type to a certificate authority (CA)-signed certificate.

In some implementations of the computing platform, the processor(s) may execute the instructions to, in response to determining that a CA-signed digital certificate is associated with the URL and that the URL is not internet-facing, provide an automated recommendation to redeploy the CA-signed digital certificate to a different URL and to change the URL's digital certificate type to a self-signed certificate.

What is claimed is:

1. An apparatus configured for identification of a data type associated with an application server, the apparatus comprising:

a non-transient computer-readable storage medium having executable instructions embodied thereon; and one or more hardware processors configured to execute the instructions to:

determine, based on scanning real-time traffic associated with the application server, a digital certificate type associated with the application server and whether the application server is internet-facing;

examine an application log associated with the application server with respect to presence of masking characters associated with masking personally identifiable information (PII); and in response to detecting masking characters in the application log:

perform a real-time determination that the application server processes PII data; and generate a recommendation with respect to additional protection or encryption for the PII data;

generate, based on the determination of whether the application server is internet-facing and based on the digital certificate type associated with the application server, a certificate management assessment result; and initiate a certificate change if the digital certificate type is determined to be unsuitable with respect to security requirements associated with the application server.

2. The apparatus of claim 1 wherein the one or more hardware processors are further configured to execute the instructions to:

perform the real-time determination that the application server processes PII data independent of direct access to application data associated with the application server.

3. The apparatus of claim 1 wherein the one or more hardware processors are further configured to execute the instructions to:

examine the application log with respect to presence of a data field name associated with processing PII data; and perform the real-time determination that the application server processes PII data in response to one or more of detecting masking characters in the application log and detecting presence of a data field name associated with processing PII data.

4. The apparatus of claim 1 wherein the one or more hardware processors are further configured to execute the instructions to:

examine a code repository associated with the application server; and identify class-level or application-level information associated with processing PII data.

5. The apparatus of claim 1 wherein the one or more hardware processors are further configured to execute the instructions to:

examine a code repository associated with the application server; and identify presence or absence of a variable name associated with processing PII data.

6. The apparatus of claim 1 wherein the one or more hardware processors are further configured to execute the instructions to:

generate a security recommendation based on determining that an application programming interface (API) associated with the application server requires additional protection or encryption.

7. The apparatus of claim 1 wherein the one or more hardware processors are further configured to execute the instructions to:

receive a feed from a monitoring system, the feed comprising the real-time traffic associated with the application server.

8. A processor-implemented method of identifying a data type associated with an application server, the method comprising:

determining, based on scanning real-time traffic associated with the application server, a digital certificate type associated with the application server and whether the application server is internet-facing;

examining an application log associated with the application server with respect to presence of masking characters associated with masking personally identifiable information (PII); and in response to detecting masking characters in the application log:

performing a real-time determination that the application server processes PII data; and generating a recommendation with respect to additional protection or encryption for the PII data;

generating, based on the determination of whether the application server is internet-facing and based on the digital certificate type associated with the application server, a certificate management assessment result; and initiating a certificate change if the digital certificate type is determined to be unsuitable with respect to security requirements associated with the application server.

9. The method of claim 8 further comprising:

performing the real-time determination that the application server processes PII data independent of direct access to application data associated with the application server.

10. The method of claim 8 further comprising:

examining the application log with respect to presence of a data field name associated with processing PII data; and performing the real-time determination that the application server processes PII data in response to one or more of detecting marking characters in the application log and detecting presence of a data field name associated with processing PII data.

11. The method of claim 8 further comprising:

examining a code repository associated with the application server; and identifying class-level or application-level information associated with processing PII data.

12. The method of claim 8 further comprising:

examining a code repository associated with the application server; and identifying presence or absence of a variable name associated with processing PII data.

13. The method of claim 8 further comprising:

generating a security recommendation based on determining that an application programming interface (API) associated with the application server requires additional protection or encryption.

14. The method of claim 8 further comprising:

receiving a feed from a monitoring system, the feed comprising the real-time traffic associated with the application server.

15. A non-transient computer-readable storage medium having instructions embodied thereon, the instructions being executable by one or more processors to perform a method of identifying a data type associated with an application server, the method comprising:

determining, based on scanning real-time traffic associated with the application server, a digital certificate type associated with the application server and whether the application server is internet-facing;

examining an application log associated with the application server with respect to presence of masking characters associated with masking personally identifiable information (PII); and in response to detecting masking characters in the application log:

performing a real-time determination that the application server processes PII data; and generating a recommendation with respect to additional protection or encryption for the PII data;

generating, based on the determination of whether the application server is internet-facing and based on the digital certificate type associated with the application server, a certificate management assessment result; and initiating a certificate change if the digital certificate type is determined to be unsuitable with respect to security requirements associated with the application server.

16. The non-transient computer-readable storage medium of claim 15 wherein the method further comprises:

performing the real-time determination that the application server processes PII data independent of direct access to application data associated with the application server.

17. The non-transient computer-readable storage medium of claim 15 wherein the method further comprises:

performing the real-time determination that the application server processes PII data independent of direct access to application data associated with the application server.

18. The non-transient computer-readable storage medium of claim 15 wherein the method further comprises:

examining the application log with respect to presence of a data field name associated with processing PII data; and performing the real-time determination that the application server processes PII data in response to one or more of detecting marking characters in the application log and detecting presence of a data field name associated with processing PII data.

19. The non-transient computer-readable storage medium of claim 15 wherein the method further comprises:

examining a code repository associated with the application server; and identifying class-level or application-level information associated with processing PII data.

20. The non-transient computer-readable storage medium of claim 19 wherein the method further comprises:

examining a code repository associated with the application server, and identifying presence or absence of a variable name associated with processing PII data.

* * * * *